(12) United States Patent
Zhang et al.

(10) Patent No.: US 12,032,144 B2
(45) Date of Patent: Jul. 9, 2024

(54) INTERNAL-REFLECTIVE TELECENTRIC LENS SYSTEM

(71) Applicant: SHENZHEN GUANGJIAN TECHNOLOGY CO., LTD., Guangdong (CN)

(72) Inventors: Tianshu Zhang, Shenzhen (CN); Ruibin Huang, Shenzhen (CN); Li Zhu, Shenzhen (CN); Fanglu Lyu, Shenzhen (CN); Bo Wang, Shenzhen (CN)

(73) Assignee: Shenzhen Guangjian Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/110,754

(22) Filed: Feb. 16, 2023

(65) Prior Publication Data

US 2023/0194839 A1 Jun. 22, 2023

Related U.S. Application Data

(63) Continuation of application No. 17/105,058, filed on Nov. 25, 2020, now Pat. No. 11,586,023.

(30) Foreign Application Priority Data

| Aug. 31, 2020 | (CN) | ......................... 202010894081.X |
| Oct. 20, 2020 | (CN) | ......................... 202022331891.2 |
| Oct. 20, 2020 | (CN) | ......................... 202022331921.X |

(51) Int. Cl.
*G02B 13/22* (2006.01)
*G02B 9/34* (2006.01)
*G02B 13/00* (2006.01)

(52) U.S. Cl.
CPC .............. *G02B 13/22* (2013.01); *G02B 9/34* (2013.01); *G02B 13/0065* (2013.01)

(58) Field of Classification Search
CPC ....... G02B 13/22; G02B 13/0065; G02B 9/34
(Continued)

(56) References Cited

U.S. PATENT DOCUMENTS

| 6,992,718 | B1 | 1/2006 | Takahara |
| 2004/0095503 | A1* | 5/2004 | Iwasawa .............. G02B 13/009 |
| | | | 348/344 |

(Continued)

FOREIGN PATENT DOCUMENTS

| CN | 102169222 A | 8/2011 |
| CN | 206020790 U | 3/2017 |

(Continued)

OTHER PUBLICATIONS

PCT International Search Report and the Written Opinion dated Nov. 29, 2021, issued in related International Application No. PCT/CN2021/115224, with partial English translation (10 pages).

(Continued)

*Primary Examiner* — Wyatt A Stoffa
*Assistant Examiner* — Mitchell T Oestreich
(74) *Attorney, Agent, or Firm* — Sheppard Mullin Richter & Hampton LLP

(57) ABSTRACT

An internal-reflective telecentric lens system includes a first lens assembly, a reflector, and a second lens assembly. The first lens assembly includes a first lens. The second lens assembly includes a second lens, a third lens, and a fourth lens, that are disposed in sequence along a light path. The first lens assembly is configured to receive and output one or more light beams towards the reflector. The reflector is configured to reflect the light beams towards the second lens assembly. The second lens assembly is configured to receive and converge the light beams reflected by the reflector at a diaphragm between the second lens and the third lens, and (Continued)

transmit the light beams past the diaphragm through the third and the fourth lenses for imaging.

20 Claims, 14 Drawing Sheets

(58) Field of Classification Search
USPC .......................................................... 359/663
See application file for complete search history.

(56) References Cited

U.S. PATENT DOCUMENTS

2017/0322390 A1    11/2017  Huang
2022/0066181 A1     3/2022  Zhang et al.

FOREIGN PATENT DOCUMENTS

| | | |
|---|---|---|
| CN | 110488469 A | 11/2019 |
| CN | 213987009 U | 8/2021 |
| IN | 213957737 U | 8/2021 |

OTHER PUBLICATIONS

Non-Final Office Action dated Jun. 23, 2022, issued in related U.S. Appl. No. 17/105,058 (12 pages).

Notice of Allowance dated Oct. 20, 2022, issued in related U.S. Appl. No. 17/105,058 (11 pages).

* cited by examiner

INTERNAL-REFLECTIVE TELECENTRIC LENS SYSTEM

CROSS REFERENCE TO RELATED APPLICATION

The present application is a continuation of U.S. patent application Ser. No. 17/105,058, filed Nov. 25, 2020, entitled "Internal-Reflective Telecentric Lens System," which is based on and claims priority to the Chinese Patent Application No. 202010894081.X, filed Aug. 31, 2020, the Chinese Patent Application No. 202022331921.X, filed Oct. 20, 2020, and the Chinese Patent Application No. 202022331891.2, filed Oct. 20, 2020. The entire contents of all of the above-references applications are incorporated herein by reference.

TECHNICAL FIELD

This invention generally relates to an optical lens system, particularly an internal-reflective telecentric lens system.

BACKGROUND

Portable devices such as mobile phones and tablet computers may contain a telecentric lens system that provides a projection function. In conventional designs, the telecentric lens system needs to occupy a relatively large space, which limits the use of the telecentric lens system in portable devices.

SUMMARY

The present disclosure is directed to an internal-reflective telecentric lens system, an improved design compared to conventional telecentric lens systems. In various embodiments, the internal-reflective telecentric lens system shortens a light path of the entire telecentric lens system by disposing a reflector inside, thereby reducing a size of the internal-reflective telecentric lens system, which allows the internal-reflective telecentric lens system to be used in a compact device such as a mobile phone that has a thickness requirement (e.g., a few mm or less).

In some embodiments, an internal-reflective telecentric lens system includes a first lens assembly, a reflector, and a second lens assembly. The first lens assembly comprises a first lens. The second lens assembly comprises a second lens and a fourth lens, that are disposed in sequence along a light path. The reflector is disposed at an image side of the first lens. The second lens is disposed at an image side of the reflector. The fourth lens is disposed at an image side of the second lens. The first lens assembly is configured to receive and output one or more light beams towards the reflector. The reflector is configured to reflect the light beams towards the second lens assembly. The second lens assembly is configured to receive and converge the light beams reflected by the reflector at a diaphragm between the second lens and the fourth lens, and transmit the light beams past the diaphragm through the fourth lens for imaging. In some embodiments, the second lens assembly further comprises a third lens disposed between the second lens and the fourth lens, and the diaphragm is disposed between the second lens and the third lens.

In some embodiments, an internal-reflective telecentric lens system includes a first lens assembly, a reflector, and a second lens assembly. The first lens assembly includes a first lens. The second lens assembly includes a second lens, a third lens, and a fourth lens, that are disposed in sequence along a light path. The reflector is disposed at an image side of the first lens. The second lens is disposed at an image side of the reflector. The third lens is disposed at an image side of the second lens. The fourth lens is disposed at an image side of the third lens. The first lens assembly is configured to receive and output one or more light beams towards the reflector. The reflector is configured to reflect the light beams towards the second lens assembly. The second lens assembly is configured to receive and converge the light beams reflected by the reflector at a diaphragm between the second lens and the third lens, and transmit the light beams past the diaphragm through the third and the fourth lenses for imaging.

In some embodiments, the first lens has a positive optical power, and an object-side surface of the first lens and an image-side surface of the first lens are convex.

In some embodiments, the second lens has a positive optical power, an object-side surface of the second lens is convex, and an image-side surface of the second lens is concave.

In some embodiments, the third lens has a positive optical power, an object-side surface of the third lens is concave, and an image-side surface of the third lens is convex.

In some embodiments, the fourth lens has a negative optical power, an object-side surface of the fourth lens is concave, and an image-side surface of the fourth lens is convex.

In some embodiments, a reflective surface of the reflector is configured to reflect the light beams towards the second lens assembly.

In some embodiments, the reflector comprises a metal layer as the reflective surface.

In some embodiments, the reflector comprises a dielectric coating as the reflective surface.

In some embodiments, the reflector comprises a total internal reflection surface of a prism as the reflective surface.

In some embodiments, a reflective surface of the reflector is a planar surface, the planar surface is disposed on the light path and between the first lens and the second lens, and inclined 40° to 50° with respect to at least one of an optical axis of the first lens, an optical axis of the second lens, an optical axis of the third lens, or an optical axis of the fourth lens; and the planar surface is configured to reflect the light beams towards the second lens assembly by 90°.

In some embodiments, an optical spacing between the first lens and the second lens is greater than a length dimension of the reflector and less than $\sqrt{2}$ times the length dimension of the reflector.

In some embodiments, the internal-reflective telecentric lens system satisfies: 73°<FOV<112° wherein FOV is a field of view of the internal-reflective telecentric lens system; 0.95<VP<1 wherein VP is a depth of viewpoint of the internal-reflective telecentric lens system; and |Distortion|<8% wherein Distortion is an optical distortion of the internal-reflective telecentric lens system.

In some embodiments, the first lens, the second lens, the third lens, and the fourth lens are aspheric plastic lenses; and a refractive index nd of each of the first lens, the second lens, the third lens, and the fourth lens at a wavelength of 587.6 nm satisfies the following formula:

$$1.62 < nd < 1.69.$$

In some embodiments, the internal-reflective telecentric lens system further includes an object plane disposed at an object side of the first lens.

In some embodiments, chief rays at different image heights of the object plane are parallel to an optical axis of the first lens.

In some embodiments, the second lens assembly is configured to move along an optical axis direction to change an optical distance between the first lens assembly and the second lens assembly, thereby change an object focal length of the internal-reflective telecentric lens system and enable focusing for different image plane positions.

In some embodiments, when a distance between the object plane and the first lens assembly reduces, the second lens assembly is configured to move in a direction closer to the reflector.

In some embodiments, when a distance between the object plane and the first lens assembly increases, the second lens assembly is configured to move in a direction away from the reflector.

In some embodiments, the object plane is a light spot array; and the focal plane of the internal-reflective telecentric lens system is adjustable by adjusting the second lens assembly to switch the light spot array to a flood light.

In some embodiments, the object plane has a multi-layer pattern; and the focal plane of the internal-reflective telecentric lens system is adjustable by adjusting the second lens assembly to change depths of image projections.

The present disclosure provides various benefits over conventional technologies. Firstly, by placing a reflector between the first lens assembly and the second lens assembly, the light path of the entire telecentric lens system is shortened, and the height of the telecentric lens system is reduced. As a result, the telecentric lens system may be used in an electronic device such as a mobile phone that has a thickness requirement. Secondly, when a position of the object plane relative to the first lens assembly changes, the second lens assembly may be moved correspondingly to enable separate group focusing, thereby facilitate focusing of a light projector that uses the telecentric lens system. Thus, the focusing is adjusted relative to different object plane positions without adjustment of the positional relationship between the object plane and the first lens.

The features of the internal-reflective telecentric lens system disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

Figure 1A:
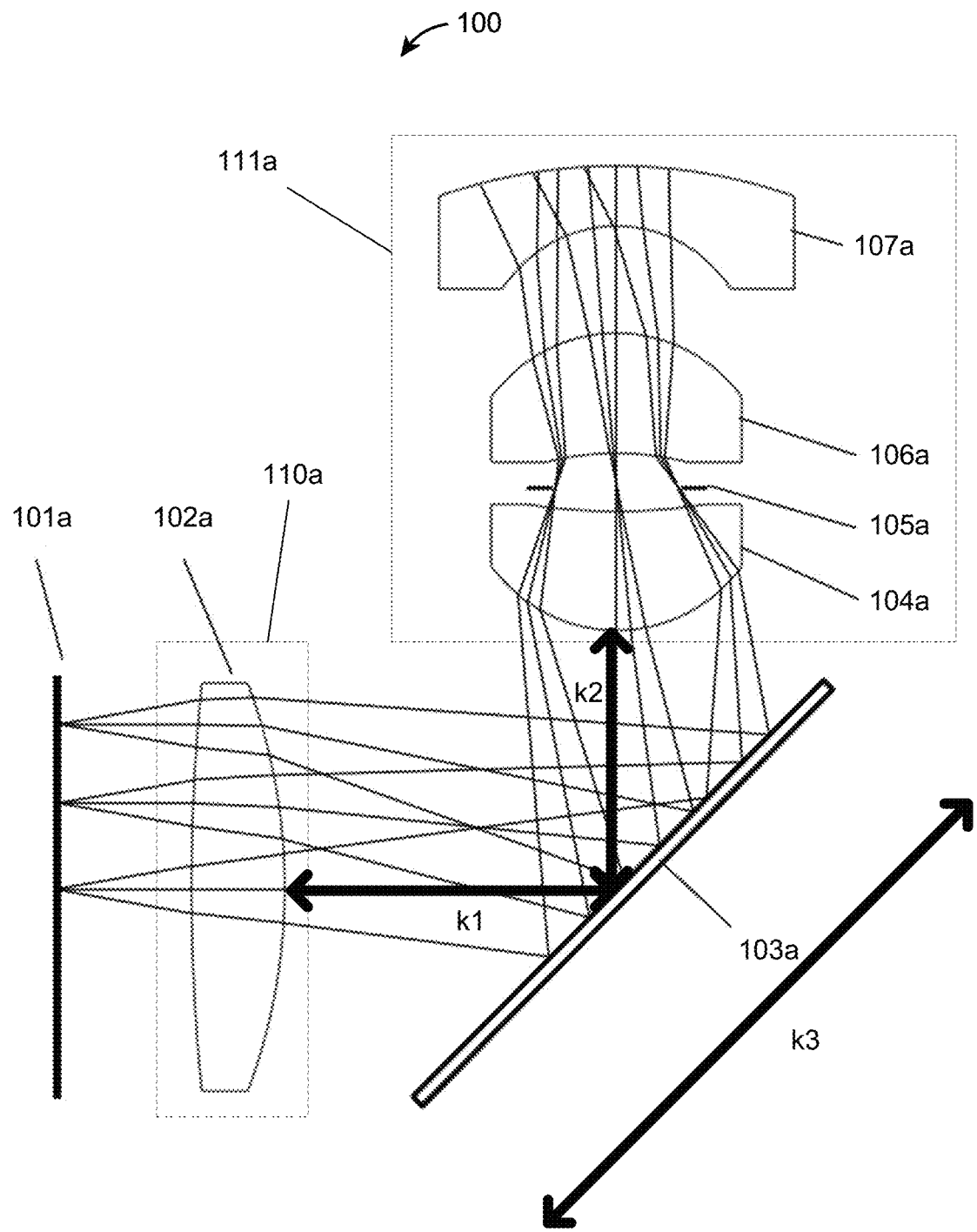
FIG. 1A illustrates an example schematic structural diagram of an internal-reflective telecentric lens system, in accordance with various embodiments of the present disclosure.

The figures depict various embodiments of the present disclosure for purposes of illustration only, wherein the figures use like reference numerals to identify like elements. One skilled in the art will readily recognize from the following discussion that alternative embodiments of the structures and methods illustrated in the figures may be employed without departing from the principles of the present disclosure described herein. It is to be understood that all examples herein are provided for illustrative purposes and that there may be many variations or other possibilities associated with the present disclosure.

DETAILED DESCRIPTION

The following embodiments will help those skilled in the art to further understand this invention but are not intended to limit this application in any form. It should be noted that a person of ordinary skill in the art may further make some variations and improvements without departing from the concept of this application. The variations and improvements belong to the protection scope of this application.

It should be noted that, when an element is described as being "fixed on" or "disposed on" another element, the element may be directly located on another element, or indirectly located on another element. When an element is described as being "connected to" another element, the element may be directly connected to the another element, or indirectly connected to the another element. In addition, the connection may be used for fixation or circuit connection.

It should be understood that orientation or position relationships indicated by the terms such as "length," "width," "above," "below," "front," "back," "left," "right," "vertical," "horizontal" "top," "bottom," "inside," and "outside" are based on orientation or position relationships shown in the accompanying drawings, and are used only for ease and brevity of illustration and description of embodiments of this application, rather than indicating or implying that the mentioned apparatus or component needs to have a particular orientation or needs to be constructed and operated in a particular orientation. Therefore, such terms should not be construed as limiting this application.

In addition, terms such as "first" and "second" are only used to describe the objective and cannot be understood as indicating or implying relative importance or implying a quantity of the indicated technical features. In view of this, a feature defined by "first" or "second" may explicitly or implicitly include one or more features. In the descriptions of the embodiments of this application, unless otherwise specified, "a plurality of" means two or more.

In various embodiments, an internal-reflective telecentric lens system provided in the present disclosure includes a first lens assembly, a reflector, and a second lens assembly, that are disposed in sequence along a light path of the internal-reflective telecentric lens system. The first lens assembly includes a first lens. The second lens assembly includes a second lens, a third lens, and a fourth lens, that are disposed in sequence along the light path. The reflector is disposed at an image side of the first lens. The second lens is disposed at an image side of the reflector. The third lens is disposed at an image side of the second lens. The fourth lens is disposed at an image side of the third lens. The first lens assembly is configured to receive and converge light beams so that the light beams are converged at a diaphragm of the second lens assembly after being reflected by the reflector. The second lens assembly is configured to receive the light beams reflected by the reflector, and transmit the light beams for imaging.

In various embodiments, the reflector is disposed inside the telecentric lens system. The incoming collimated beams are reflected and emitted from the lens assemblies to form a speckle light dot matrix on an imaging surface. As a result, a light path of the internal-reflective telecentric lens system is shortened, a height of an optical projector is reduced, and thus allows a depth camera containing an optical projector to be used in an electronic device such as a mobile phone that has a thickness requirement.

Specific, non-limiting embodiments of the present disclosure will now be described with reference to the drawings. It is to be understood that the features and aspects of any embodiment disclosed herein may be used and/or combined with the features and aspects of any other embodiment disclosed herein. It should also be understood that such embodiments are by way of example and are merely illustrative of a small number of embodiments within the scope of the present disclosure. Various changes and modifications obvious to one skilled in the art to which the present disclosure pertains are deemed to be within the spirit, scope, and contemplation of the present disclosure as further defined in the appended claims.

FIG. 1A illustrates a schematic structural diagram of an internal-reflective telecentric lens system 100. In some embodiments, the internal-reflective telecentric lens system 100 includes a first lens assembly 110a, a reflector 103a, and a second lens assembly 111a, that are disposed in sequence along a light path.

The first lens assembly 110a includes a first lens 102a. The second lens assembly 111a includes a second lens 104a, a third lens 106a, and a fourth lens 107a, that are disposed in sequence along the light path. The reflector 103a is disposed at an image side of the first lens 102a (e.g., as opposed to an object plane 101a disposed at an object side of the first lens 102a). The second lens 104a is disposed at an image side of the reflector 103a. The third lens 106a is disposed at an image side of the second lens 104a. The fourth lens 107a is disposed at an image side of the third lens 106a.

Components disposed along the light path of the internal-reflective telecentric lens system 100 include: an object plane 101a, the first lens 102a, the reflector 103a, the second lens 104a, the diaphragm 105a, the third lens 106a, and the fourth lens 107a.

The first lens assembly 110a is configured to receive light beams and output one or more light beams towards the reflector 103a. The reflector 103a is configured to reflect the light beams towards the second lens assembly 111a. The second lens assembly 111a is configured to receive the light beams reflected by the reflector 103a.

After being reflected by the reflector 103a, the light beams are converged at a diaphragm 105a of the second lens assembly 111a, and are transmitted through the third lens 106a and the fourth lens 107a for imaging.

The object plane 101a is used to provide projection patterns. The object plane 101a may be any light projector, such as a structured light projector or a laser.

In some embodiments, the first lens 102a is used to transmits the light beams from the object plane 101a.

The reflector 103a is used to reflect the light beams by 90°. A planar coated mirror may be used in the reflector 103a. A metal layer or multi-layer dielectric film coating may be used to improve the reflectivity of light on the surface of the reflector 103a.

The second lens 104a is a meniscus convex lens for converging the light beams to the diaphragm 105a.

The diaphragm 105a is a virtual plane. The light beams are converged to the narrowest at the diaphragm 105a.

The third lens 106a is a meniscus convex lens for diverging the light beams coming through the diaphragm 105a.

The fourth lens 107a is a meniscus concave lens for further diverging and transmitting the light beams coming through the third lens 106a.

In some embodiments, the first lens 102a has a positive optical power. An object-side surface and an image-side surface of the first lens are convex. Chief rays at different image heights of the object plane 101a of the telecentric lens system are parallel to an optical axis of the first lens 102a.

A reflecting surface of the reflector 103a is a plane, which is inclined from 40° to 50° with respect to the optical axes of the first lens 102a, the second lens 104a, the third lens 106a, or the fourth lens 107a. The inclination may be 45°. The reflector 103a is configured to reflect the light beams transmitted by the first lens 102a by 90° and transmit the light beams to the second lens 104a.

The reflector 103a is configured to take advantage of the characteristics of the larger optical distance between the first lens 102a and the second lens 104a and the small inclination angle of the light path. The reflector 103a is embedded in the light path to enable light path folding without increasing the total length of the telecentric lens system and facilitate miniaturization of the size of the telecentric lens system.

The second lens 104a has positive optical power. An object-side surface of the second lens is convex, and an image-side surface of the second lens is concave.

The third lens 106a has positive optical power. An object-side surface of the third lens is concave, and an image-side surface of the third lens is convex.

The fourth lens 107a has negative optical power. An object-side surface of the fourth lens is concave, and an image-side surface of the fourth lens is convex.

In some embodiments, the size of the reflector 103a and the optical distance between the first lens 102a and the second lens 104a satisfy the following formula:

Length of reflector<Optical spacing<$\sqrt{2}$*Length of reflector.

For example, in FIG. 1A, the optical spacing between the first lens and the second lens (k1+k2) is greater than a length dimension (k3) of the reflector 103a and less than $\sqrt{2}$ times the length dimension (k3) of the reflector 103a. As shown in FIG. 1A, k1+k2 is the shortest optical distance from the first lens 102a to the second lens 104a, that is, from the tip of the image-side surface of the first lens 102a to the tip of the object-side surface of the second lens 104a.

Figure 1B:
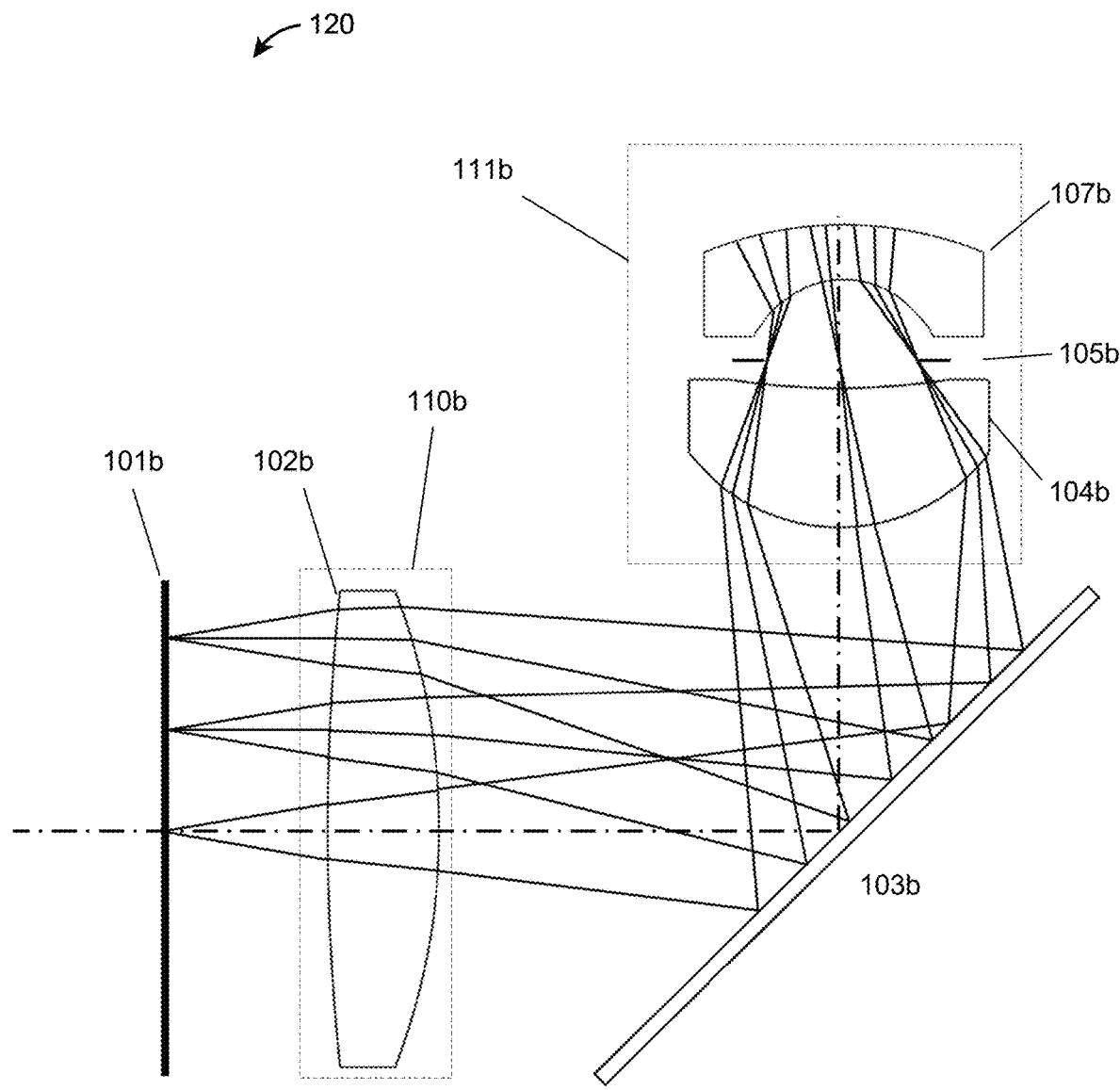
FIG. 1B illustrates an example schematic structural diagram of an internal-reflective telecentric lens system, in accordance with various embodiments of the present disclosure.
Figure 1C:
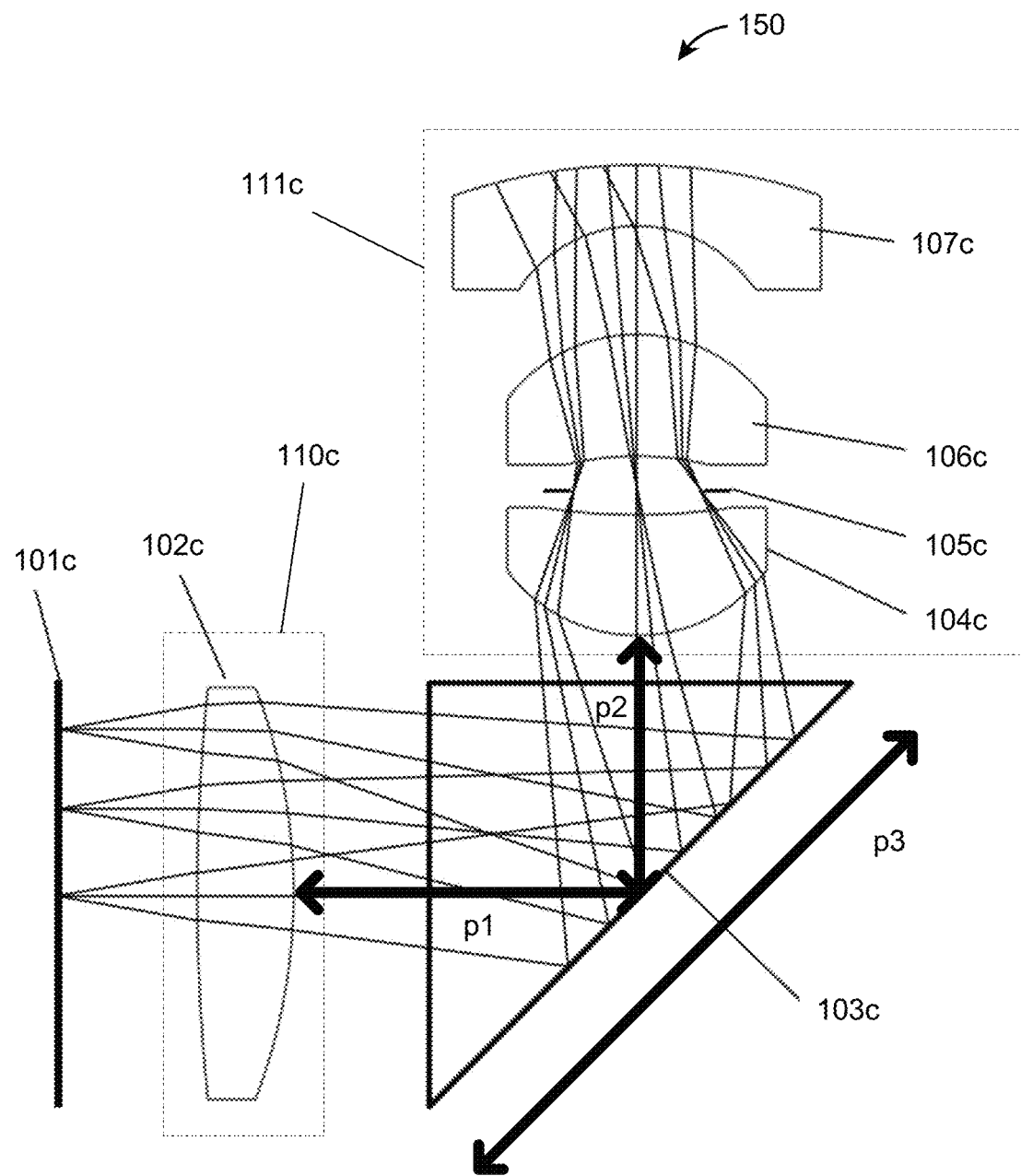
FIG. 1C illustrates an example schematic structural diagram of an internal-reflective telecentric lens system, in accordance with various embodiments of the present disclosure.

For example, in FIG. 1C, the optical spacing between the first lens and the second lens (p1+p2) is greater than a length dimension (p3) of the reflector 103c and less than V2 times the length dimension (p3) of the reflector 103c. As shown in FIG. 1C, p1+p2 is the shortest optical distance from the first lens 102c to the second lens 104c.

In some embodiments, the diaphragm 105a is disposed between the second lens 104a and the third lens 106a, so that the internal-reflective telecentric lens system satisfies the following formulas:

$73° < FOV < 112°$ where FOV is a field of view of the internal-reflective telecentric lens system. FOV is used to limit the range of the field of view of the lens to achieve a large-angle projection.

$0.95 < VP < 1$ where VP is the viewpoint depth of the internal-reflective telecentric lens system. VP is used to constrain the viewpoint depth of the lens, reduce the aperture size of the lens, and reduce vignetting at the same time, which helps improve the uniformity of the image plane illumination.

$|Distortion| < 8\%$ where Distortion is the optical distortion of the internal-reflective telecentric lens system. Distortion is used to constrain the distortion of a wide-angle lens. For a wide-angle lens, the smaller the distortion is, the more real the image profiles become.

In some embodiments, the chief rays at different image heights of the object plane 101a of the internal-reflective telecentric lens system are parallel to the optical axis of the first lens 102a.

In some embodiments, the first lens 102a, the second lens 104a, the third lens 106a, and the fourth lens 107a are aspheric plastic lenses. The lens refractive indices nd of the first lens 102a, the second lens 104a, the third lens 106a, and the fourth lens 107a satisfy the following formula:

$1.62 < nd < 1.69$ where nd is a refractive index of the lens at a wavelength of 587.6 nm.

The center of the object plane 101a and the optical axis of the first lens 102a are on the same straight line.

Optical axes of the second lens 104a, the third lens 106a, and the fourth lens 107a are on the same straight line.

The optical axis of the first lens 102a is perpendicular to the optical axes of the second lens 104a, the third lens 106a, and the fourth lens 107a.

In some embodiments, surface types, curvature radiuses, thicknesses, refractive indices nd and dispersion coefficients vd of materials of the object plane 101a, the first lens 102a, the reflector 103a, the second lens 104a, the diaphragm 105a, the third lens 106a, and the fourth lens 107a are shown in Table 1.

TABLE 1

| Surface number | Surface type | Curvature radius | Thickness | Material (nd, vd) |
|---|---|---|---|---|
| 1 | Aspheric | 3.233 | 0.353 | 1.65, 25.48 |
| 2 | Aspheric | 0.664 | 0.575 | |
| 3 | Aspheric | 0.866 | 0.329 | 1.64, 27.56 |
| 4 | Aspheric | 0.780 | 0.145 | |
| Diaphragm | Plane | Infinite | 0.110 | |
| 6 | Aspheric | −3.923 | 0.644 | 1.66, 20.37 |
| 7 | Aspheric | −0.711 | 1.415 | |
| Reflector | Plane | Infinite | 0.802 | |
| 9 | Spherical | 2.975 | 0.462 | 1.62, 33.24 |
| 10 | Spherical | −3.405 | 0.391 | |
| Object plane | Plane | Infinite | 0.000 | |

In Table 1, the surface number 1 is a light output surface of the fourth lens 107a, and the surface number 2 is a light input surface of the fourth lens 107a; the surface number 3 is a light output surface of the third lens 106a, and the surface number 4 is a light input surface of the third lens 106a; the surface number 6 is a light output surface of the second lens 104a, and the surface number 7 is a light input surface of the second lens 104a; and surface number 9 is a light output surface of the first lens 102a, and the surface number 10 is a light input surface of the first lens 102a.

FIG. 1B illustrates a schematic structural diagram of the internal-reflective telecentric lens system 120. In some embodiments, the internal-reflective telecentric lens system 120 includes an object plane 101b, a first lens assembly 110b, a reflector 103b, and a second lens assembly 111b, that are disposed in sequence along a light path. The first lens assembly 110b includes a first lens 102a. The second lens assembly 111b includes a second lens 104b, a diaphragm 105b, and a fourth lens 107b, that are disposed in sequence along the light path.

The various components 101b, 102b, 103b, 104b, 105b, 107b, and 110b in FIG. 1B may be similar to 101a, 102a, 103a, 104a, 105a, 107a, and 110a described above with reference to FIG. 1A. One difference is that the second lens assembly 111b does not include a third lens. As shown in FIG. 1B, the fourth lens 107b is disposed at an image side of the second lens 104b. The second lens assembly 111b is configured to receive and converge the light beams reflected by the reflector 103b at the diaphragm 105b between the second lens 104b and the fourth lens 107b, and transmit the light beams past the diaphragm 105b through the fourth lens 107b for imaging. The omission of the third lens in the second lens assembly 111b may further reduce the size of the internal-reflective telecentric lens system 120, making the system more compact.

FIG. 1C illustrates a schematic structural diagram of the internal-reflective telecentric lens system 150. In some embodiments, the internal-reflective telecentric lens system 150 includes a first lens assembly 110c, a right-angle reflection prism 103c, and a second lens assembly 111c, that are arranged in sequence along a light path.

As shown in FIG. 1C, the right-angle total reflection prism 103c may be used as an alternative to the reflector 103a in FIG. 1A. Since the light beams are totally reflected on an inclined reflective surface of the right-angle reflection prism, and an angle of light incident on the right-angle prism exceeds a critical angle of total reflection, 100% reflectivity may be achieved without coating on the inclined surface. However, the right-angled surface needs to be coated with an anti-reflection coating to increase the transmittance.

Components disposed along the light path of the internal-reflective telecentric lens system 150 include: an object plane 101c, a first lens 102c, the right-angle reflection prism 103c, a second lens 104c, a diaphragm 105c, a third lens 106c, and a fourth lens 107c.

The components 101c, 102c, 104c, 105c, 106c, and 107c in FIG. 1C are similar to the components 101a, 102a, 104a, 105a, 106a, and 107a in FIG. 1A in terms of configurations and functions.

Figure 1D:
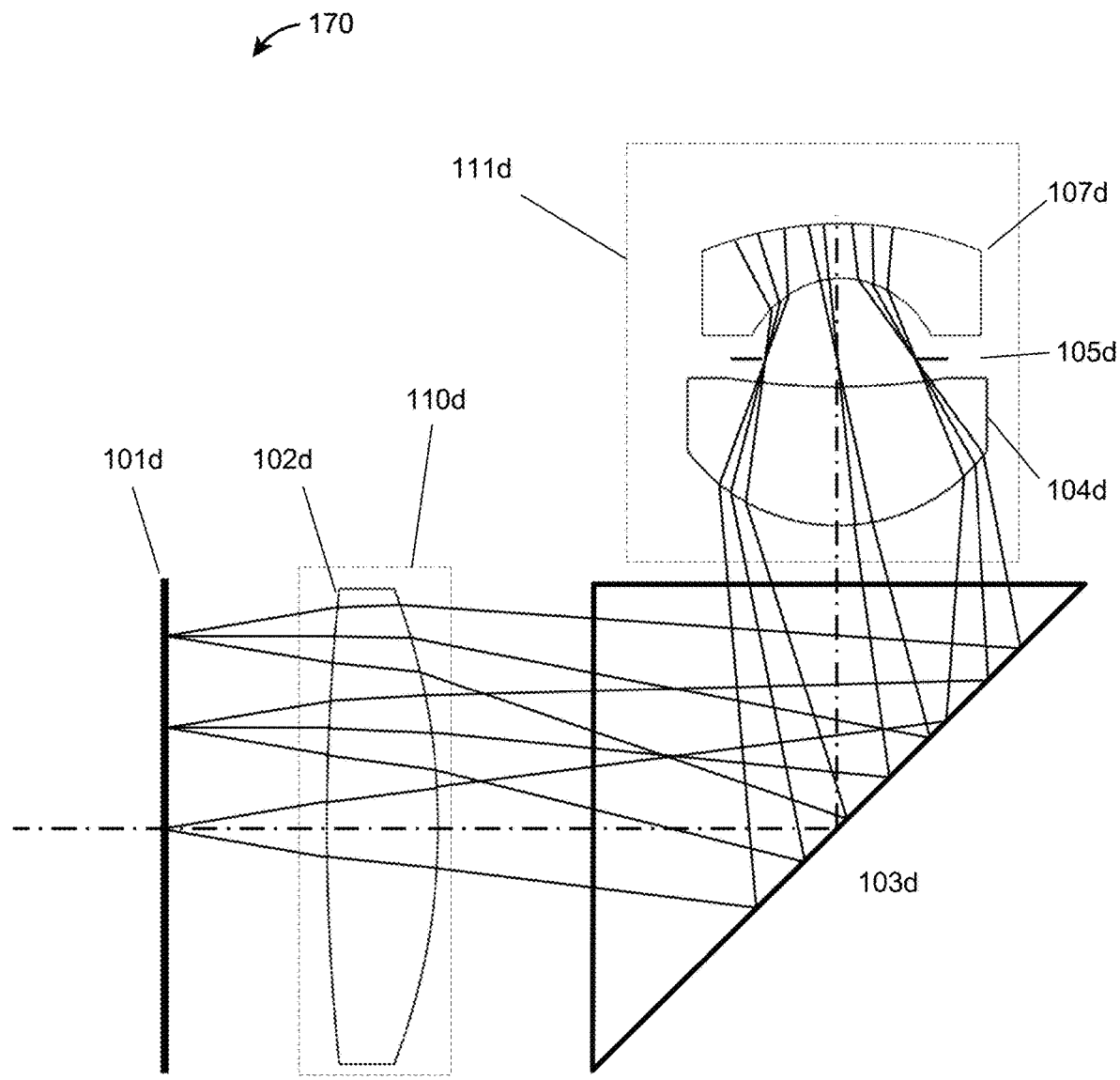
FIG. 1D illustrates an example schematic structural diagram of an internal-reflective telecentric lens system, in accordance with various embodiments of the present disclosure.

FIG. 1D illustrates a schematic structural diagram of the internal-reflective telecentric lens system 170. In some embodiments, the internal-reflective telecentric lens system 170 includes an object plane 101d, a first lens assembly 110d, a reflector 103d, and a second lens assembly 111d, that are disposed in sequence along a light path. The first lens assembly 110d includes a first lens 102d. The second lens assembly 111d includes a second lens 104d, a diaphragm 105d, and a fourth lens 107d, that are disposed in sequence along the light path.

The various components 101d, 102d, 103d, 104d, 105d, 107d, and 110d in FIG. 1D may be similar to 101c, 102c, 103c, 104c, 105c, 107c, and 110c described above with reference to FIG. 1C. One difference is that the second lens assembly 111d does not include a third lens. As shown in FIG. 1D, the fourth lens 107d is disposed at an image side of the second lens 104d. The second lens assembly 111d is configured to receive and converge the light beams reflected by the reflector 103d at the diaphragm 105d between the second lens 104d and the fourth lens 107d, and transmit the light beams past the diaphragm 105d through the fourth lens 107d for imaging. The omission of the third lens in the second lens assembly 111d may further reduce the size of the internal-reflective telecentric lens system 170, making the system more compact.

Figure 2:
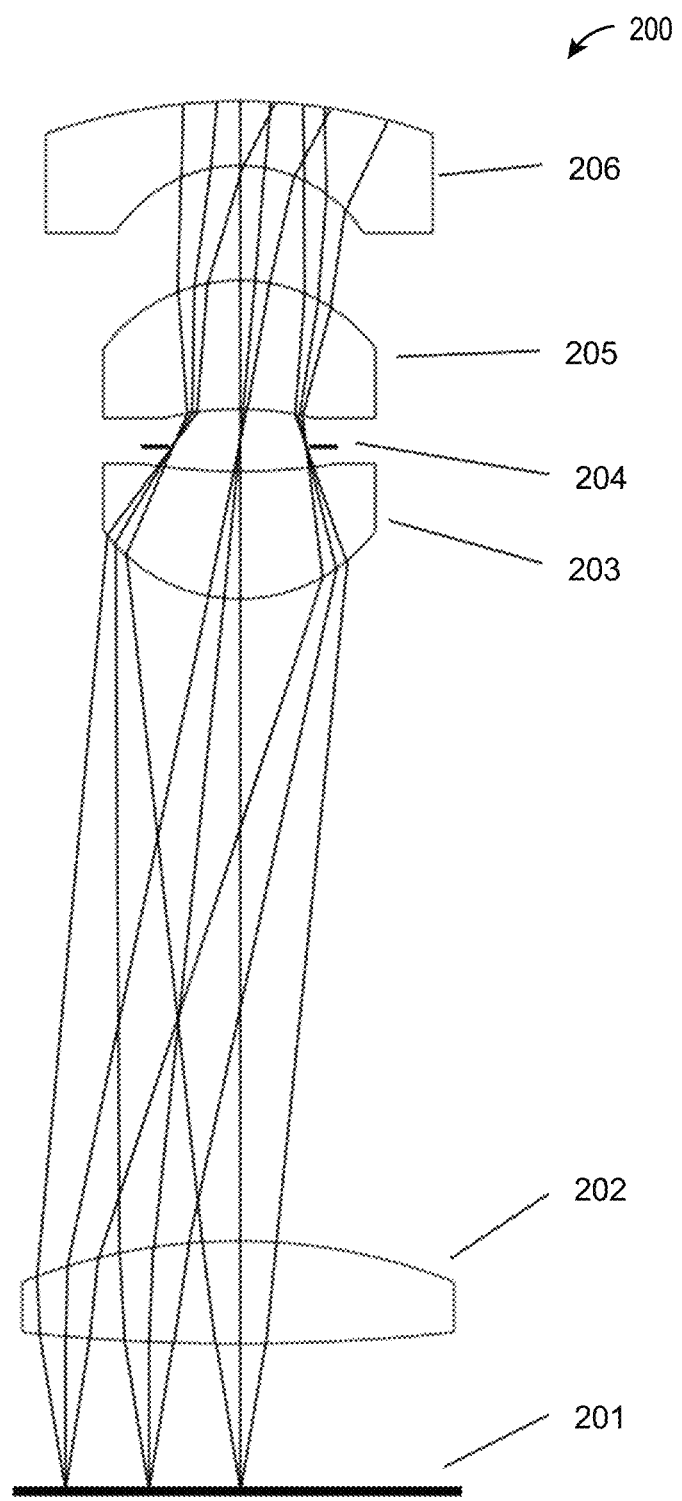
FIG. 2 illustrates an example schematic structural diagram of a telecentric lens system without a reflector or a right-angle total reflection prism, in accordance with various embodiments of the present disclosure.

FIG. 2 illustrates a schematic structural diagram of a telecentric lens system 200 without a reflector or a right-angle total reflection prism, in accordance with various embodiments of the present disclosure. The optical axes of an object plane 201, a first lens 202, a second lens 204, a third lens 206, a fourth lens 207 are all on the same straight line.

In the design of a direct structure as shown in FIG. 2, an object plane is perpendicular to an optical axis, and an image of the object plane is projected through the telecentric lens system 200 from the bottom up. Due to the omission of a reflector or a right-angle total reflection prism that can turn light beams around inside the telecentric lens system, there is a need for a relatively large spacing between the first lens 202 and other lenses of the telecentric projection lens system. Therefore, the height of the telecentric lens system 200 is large.

Figure 3:
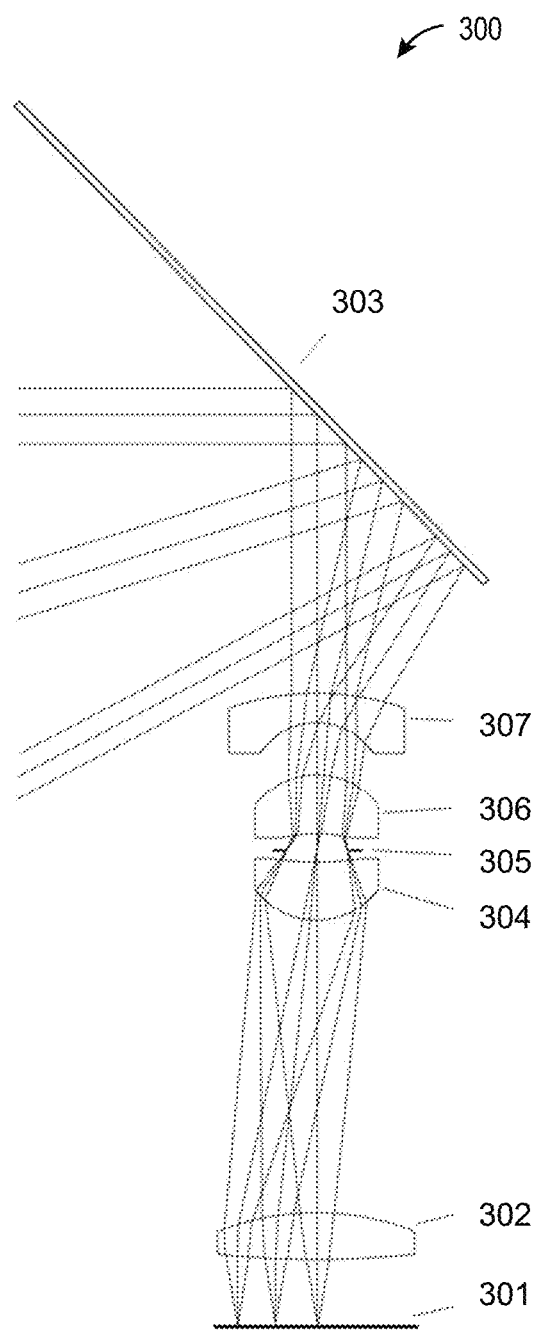
FIG. 3 illustrates an example schematic structural diagram of a telecentric lens system with a reflector disposed at an end of a light output, in accordance with various embodiments of the present disclosure.

FIG. 3 illustrates a schematic structural diagram of a telecentric lens system 300 with a reflector 303 disposed at an end of a light output, in accordance with various embodiments of the present disclosure. The optical axes of the object plane 301, the first lens 302, the second lens 304, the third lens 306, and the fourth lens 307 are on the same straight line. The reflector 303 is disposed at the image side of the fourth lens 307 to reflect light beams at 90°. Both the length and the height of the telecentric lens system 300 are large.

Figure 4:
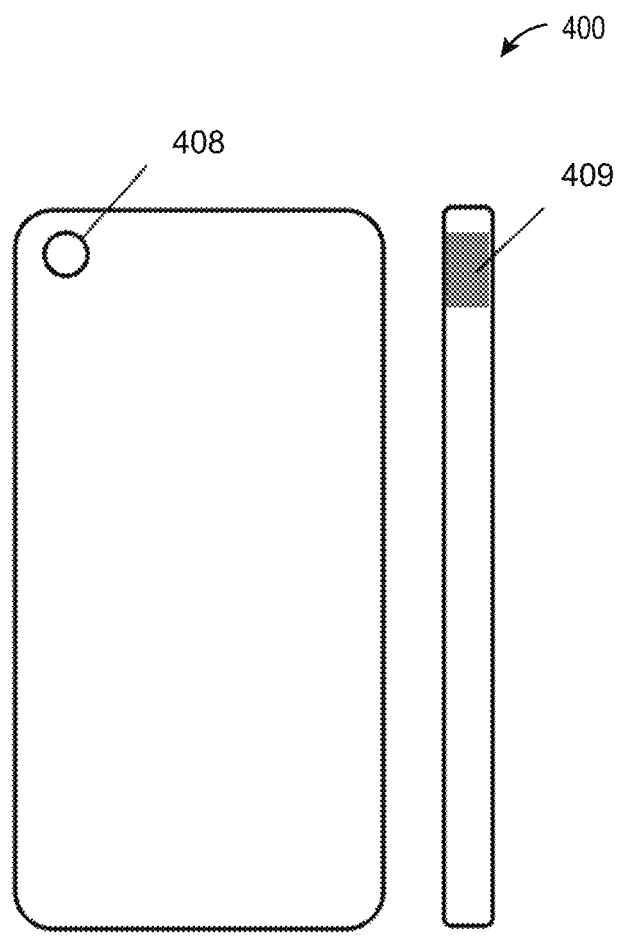
FIG. 4 illustrates an example schematic diagram of side views of an internal-reflective telecentric lens system mounted in a mobile phone, in accordance with various embodiments of the present disclosure.

FIG. 4 illustrates side views 400 of an internal-reflective telecentric lens system mounted in a mobile phone, in accordance with various embodiments of the present disclosure.

As shown in FIG. 4, in a compact device such as a mobile phone, the aperture size 408 and the height 409 of a telecentric lens system are limited by the size of the compact device. Therefore, the smaller the aperture size of the telecentric lens, the better. The height of the telecentric lens needs to be smaller than the thickness of the mobile phone. For example, a smart phone is usually less than 0.79 inches (i.e., 20 millimeters) thick. An average thickness of a smartphone hovers around 0.35 inches (i.e., 8.9 millimeters).

Figure 5A:
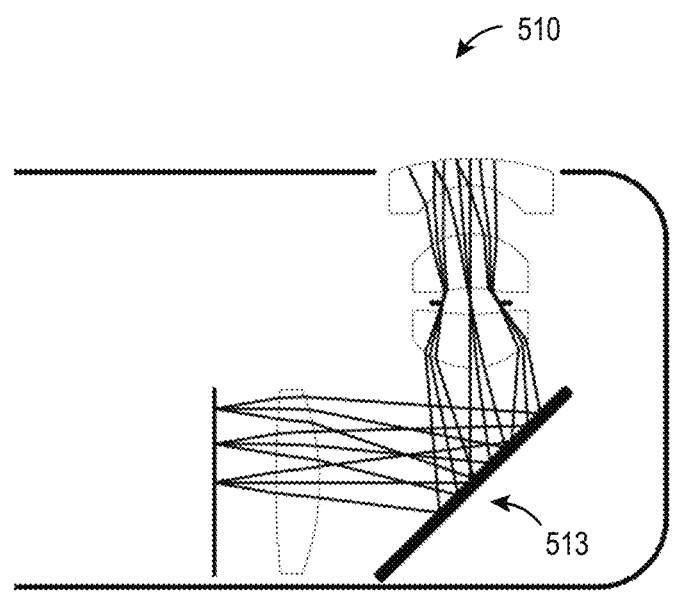
FIG. 5A illustrates an example schematic diagram of a size of an internal-reflective telecentric lens system mounted in a mobile phone, in accordance with various embodiments of the present disclosure.
Figure 5B:
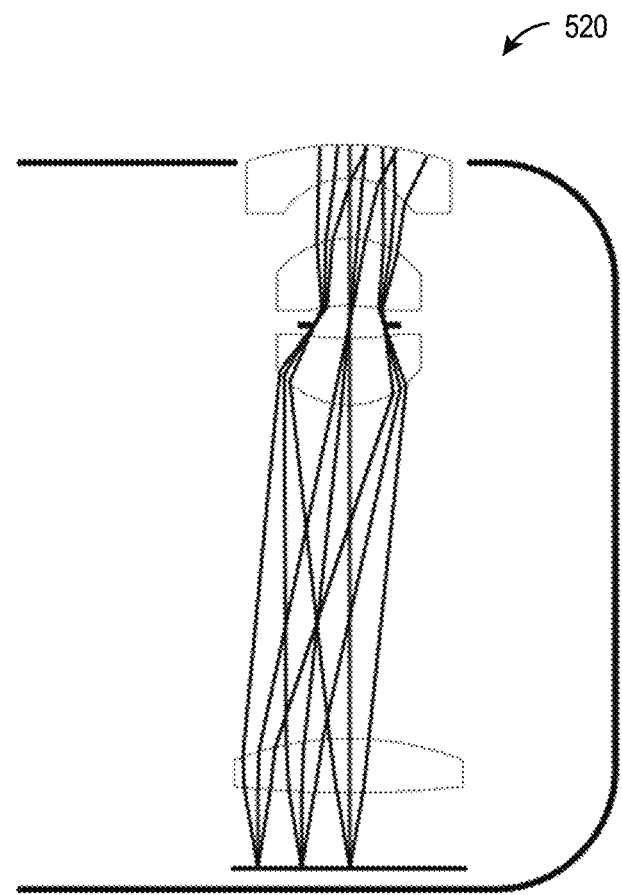
FIG. 5B illustrates an example schematic diagram of a size of an internal-reflective telecentric lens system without a reflector, the internal-reflective telecentric lens system being mounted in a mobile phone, in accordance with various embodiments of the present disclosure.
Figure 5C:
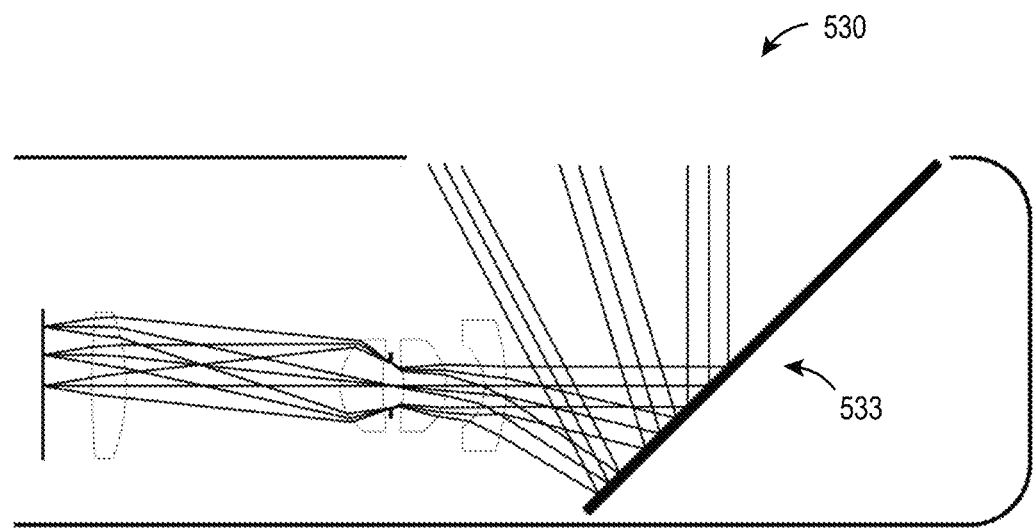
FIG. 5C illustrates an example schematic diagram of a size of a telecentric lens system with a reflector disposed at an end of a light output, the internal-reflective telecentric lens system being mounted in a mobile phone, in accordance with various embodiments of the present disclosure.

FIG. 5A illustrates a schematic diagram of a size of an internal-reflective telecentric lens system 510 mounted in a mobile phone, in accordance with various embodiments of the present disclosure. The telecentric lens system 510 includes a reflector 513. FIG. 5B illustrates a schematic diagram of the size of another telecentric lens system 520 mounted in a mobile phone, in accordance with various embodiments of the present disclosure. The telecentric lens system 520 does not include a reflector. FIG. 5C illustrates a schematic diagram of the size of yet another telecentric lens system 530 mounted in the mobile phone, in accordance with various embodiments of the present disclosure. A reflector 533 is disposed at an end of a light output of the telecentric lens system 530. As shown in FIGS. 5A-5C, the internal-reflective telecentric lens system 510 including a reflector 513 has a lower optical height than the telecentric lens system 520 without a reflector. The internal-reflective telecentric lens system 510 also has a lower optical height, a shorter length, and a smaller aperture compared to the telecentric lens system 530 with the reflector 533 disposed at the end of the light output. Thus, the telecentric lens system 510 including a reflector 513 has compatibility with compact devices.

Figure 6:
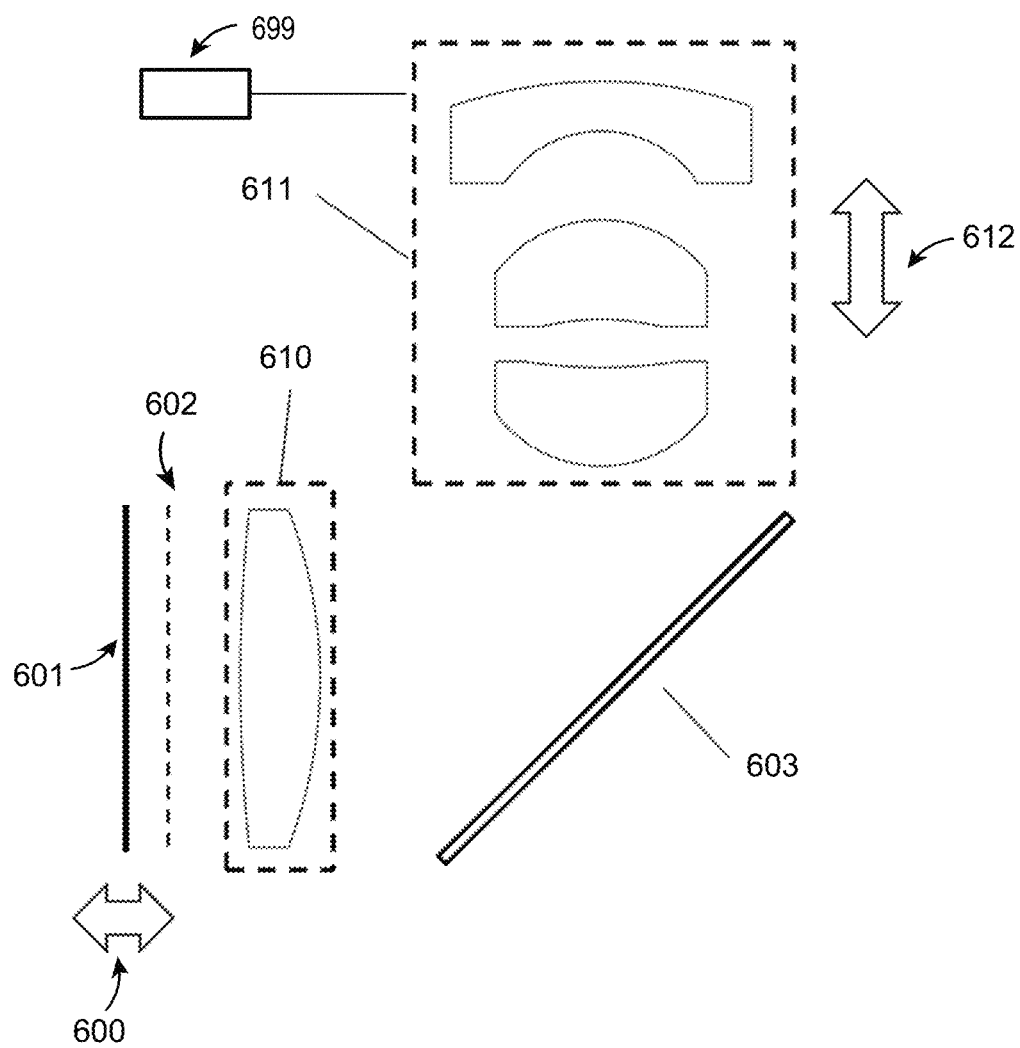
FIG. 6 illustrates an example schematic diagram of a focusing principle of a first lens assembly and a second lens assembly, in accordance with various embodiments of the present disclosure.

FIG. 6 illustrates a schematic diagram of a focusing principle of the first lens assembly and the second lens assembly, in accordance with various embodiments of the present disclosure. As shown in FIG. 6, the second lens assembly 611 may move along the optical axis, thereby enabling focus adjustment. In some embodiments, the internal-reflective telecentric lens system described herein may include a micro-motor 699 coupled to the second lens assembly 611 to effectuate the movement of the second lens assembly 611.

For example, when the object plane 601 is located at the dotted line 602, the first lens assembly 610 displaces relatively to the object plane 601 and loses focus. That is, the horizontal displacement 600 as shown in FIG. 6 occurs. The position of the second lens assembly 611 may be adjusted by moving in the vertical direction 612 shown in FIG. 6 to compensate and refocus.

An exemplary direction of focal adjustment is as follows: when the distance between the object plane 601 and the first lens assembly 610 is reduced, the second lens assembly 611 is moved in a direction closer to the reflector 603. When the distance between the object plane 601 and the first lens assembly 610 is increased, the second lens assembly 611 is moved in a direction away from the reflector 603.

In some embodiments, the object plane (surface) 601 is a light spot array, and the focal plane of the internal-reflective telecentric lens system is adjustable by adjusting the second lens assembly 611 to switch the light spot array to a flood light. The micro-motor 699 coupled to the second lens assembly 611 may effectuate the adjustment of the second lens assembly 611.

In some embodiments, the object plane (surface) 601 has a multi-layer pattern, and the focal plane of the internal-reflective telecentric lens system is adjustable by adjusting the second lens assembly 611 to change depths of image projections. The micro-motor 699 coupled to the second lens assembly 611 may effectuate the adjustment of the second lens assembly 611.

Figure 7:
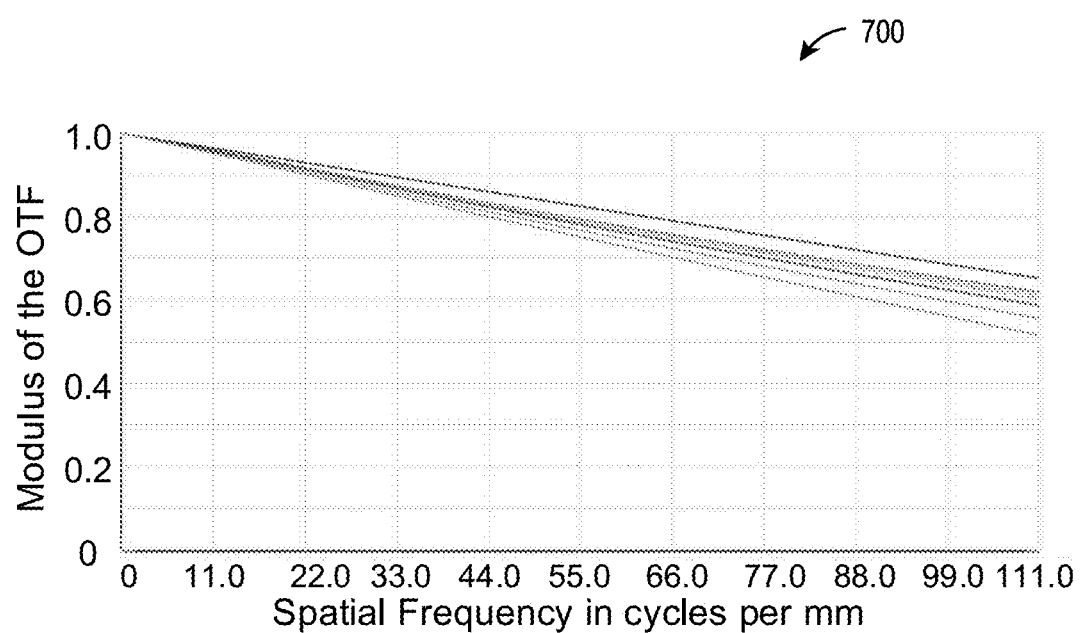
FIG. 7 illustrates an example graph of a modulation transfer function (MTF) of an optical system, in accordance with various embodiments of the present disclosure.

FIG. 7 illustrates a graph 700 of a modulation transfer function (MTF) of an optical system, in accordance with various embodiments of the present disclosure. The MTF transfer function may comprehensively show the imaging quality of the optical system. When the curve is higher and smoother on the y-axis, it indicates that the imaging quality of the optical system is better. As shown in FIG. 7, the x-axis indicates the Spatial Frequency in cycles Per Millimeter. The y-axis represents the MTF value. The higher the curve, the better the image quality. In the ordinate "Modulus of the OTF", OTF stands for optical transfer function. That is, the ordinate is the optical modulation transfer function. In some embodiments of the present disclosure, the resolution of the internal-reflective telecentric lens system is greater than 110 line pairs per millimeter.

Figure 8:
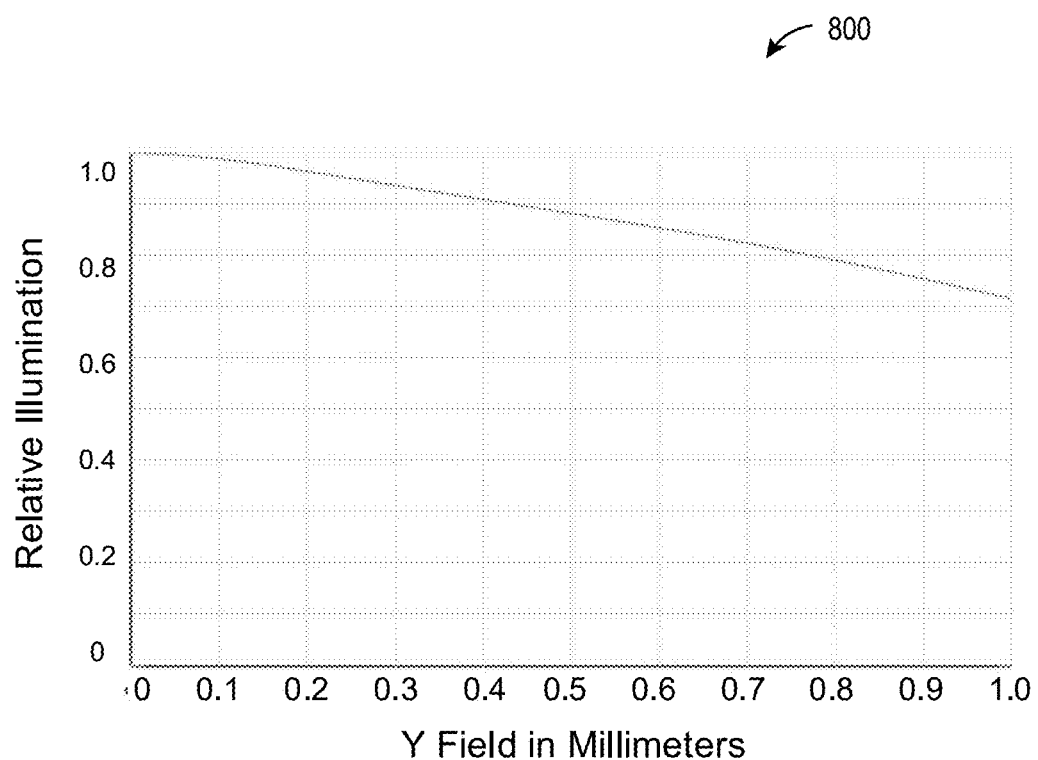
FIG. 8 illustrates an example graph of a relative illumination of an optical system, in accordance with various embodiments of the present disclosure.

FIG. 8 illustrates a graph 800 of relative illumination of an optical system, in accordance with various embodiments of the present disclosure. As shown in FIG. 8, the y-axis "Relative Illumination" is a relative illuminance, and the x-axis "Y Field Millimeters" is the height in the Y direction in millimeter.

When the graph is higher and smoother on the y-axis, it indicates that the relative illumination of the optical system is more uniform. In the embodiments of the present disclosure, the relative illumination of the largest field of view of the internal-reflective telecentric lens system is greater than 70%.

Figure 9:
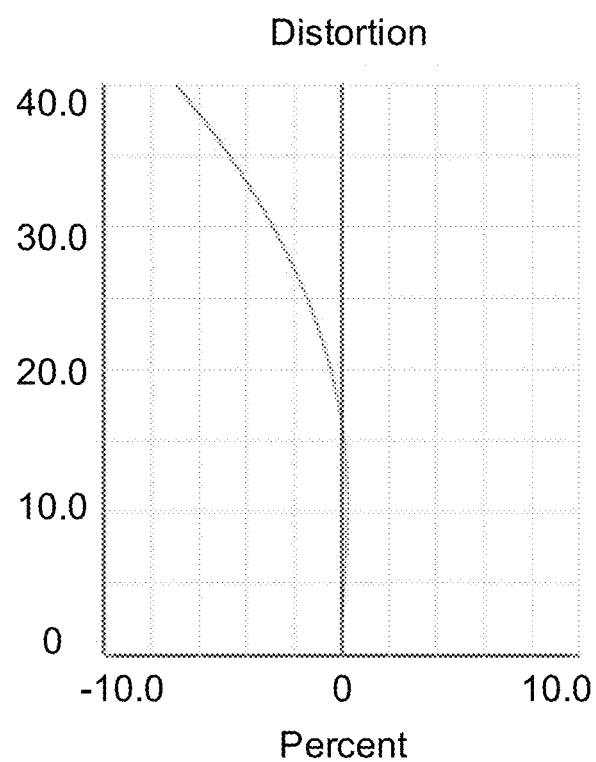
FIG. 9 illustrates an example distortion graph of an optical system, in accordance with various embodiments of the present disclosure.

FIG. 9 illustrates a distortion graph 900 of an optical system, in accordance with various embodiments of the present disclosure. As shown in FIG. 9, the x-axis "Percent" is a percentage, and the y-axis "Distortion" is a distortion. In the embodiments of the present disclosure, the distortion of the internal-reflective telecentric lens system in a full field of view is less than 7%.

In various embodiments, a reflector is disposed between the first lens assembly and the second lens assembly, which shortens the light path length of the entire telecentric lens, thereby reducing the height of the telecentric lens, and thus allows the telecentric lens to be used in an electronic device such as a mobile phone that has a thickness requirement. When the position of the object plane relative to the first lens assembly changes, the second lens assembly may be moved correspondingly to enable separate group focusing, thereby facilitate focusing of a light projector using the telecentric lens, so as to be able to match different object plane positions without adjusting the positional relationship between the object plane and the first lens.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this present disclosure. The Detailed Description, therefore, is not to be taken in a limiting sense, and the scope of various embodiments is defined only by the appended claims, along with the full range of equivalents to which such claims are entitled.

What is claimed is:

1. An internal-reflective telecentric lens system, comprising:
   a first lens assembly;
   a reflector; and
   a second lens assembly, wherein:
      the first lens assembly comprises a first lens;
      the second lens assembly comprises a second lens, a third lens, and a fourth lens, that are disposed in sequence along a light path;
      the reflector is disposed at an image side of the first lens;
      the second lens is disposed at an image side of the reflector;
      the fourth lens is disposed at an image side of the second lens;
      the first lens assembly is configured to receive and output one or more light beams towards the reflector;
      the reflector is configured to reflect the one or more light beams towards the second lens assembly;
      the second lens assembly is configured to receive and converge the one or more light beams reflected by the reflector at a diaphragm between the second lens and the fourth lens, and transmit the one or more light beams past the diaphragm through the fourth lens for imaging;
      an object-side surface of the third lens is concave, and an image-side surface of the third lens is convex, and
      the fourth lens has a negative optical power, an object-side surface of the fourth lens is concave, and an image-side surface of the fourth lens is convex.

2. The internal-reflective telecentric lens system of claim 1, wherein the diaphragm is disposed between the second lens and the third lens.

3. The internal-reflective telecentric lens system of claim 2, wherein the third lens has a positive optical power.

4. The internal-reflective telecentric lens system of claim 1, wherein a reflective surface of the reflector is configured to reflect the one or more light beams towards the second lens assembly.

5. The internal-reflective telecentric lens system of claim 4, wherein the reflector comprises a metal layer as the reflective surface.

6. The internal-reflective telecentric lens system of claim 4, wherein the reflector comprises a dielectric coating as the reflective surface.

7. The internal-reflective telecentric lens system of claim 4, wherein the reflector comprises a total internal reflection surface of a prism as the reflective surface.

8. The internal-reflective telecentric lens system of claim 1, wherein:
a reflective surface of the reflector is a planar surface,
the planar surface is disposed on the light path and between the first lens and the second lens, and inclined 40° to 50° with respect to at least one of an optical axis of the first lens, an optical axis of the second lens, or an optical axis of the fourth lens; and
the planar surface is configured to reflect the one or more light beams towards the second lens assembly by 90°.

9. The internal-reflective telecentric lens system of claim 1, wherein an optical spacing between the first lens and the second lens is greater than a length dimension of the reflector and less than $\sqrt{2}$ times the length dimension of the reflector.

10. The internal-reflective telecentric lens system of claim 1, wherein the internal-reflective telecentric lens system satisfies:

$$73°<FOV<112°$$

wherein FOV is a field of view of the internal-reflective telecentric lens system;

$$0.95<VP<1$$

wherein VP is a depth of viewpoint of the internal-reflective telecentric lens system; and $$|Distortion|<8\%$$

wherein Distortion is an optical distortion of the internal-reflective telecentric lens system.

11. The internal-reflective telecentric lens system of claim 1, wherein:
the first lens, the second lens, the third lens, and the fourth lens are aspheric plastic lenses; and
a refractive index nd of each of the first lens, the second lens, the third lens, and the fourth lens at a wavelength of 587.6 nm satisfies the following formula:

$$1.62<nd<1.69.$$

12. The internal-reflective telecentric lens system of claim 1, further comprising an object plane disposed at an object side of the first lens.

13. The internal-reflective telecentric lens system of claim 12, wherein chief rays at different image heights of the object plane are parallel to an optical axis of the first lens.

14. The internal-reflective telecentric lens system of claim 13, wherein the second lens assembly is configured to move along an optical axis direction to change an optical distance between the first lens assembly and the second lens assembly, thereby changing an object focal length of the internal-reflective telecentric lens system and enabling focusing for different image plane positions.

15. The internal-reflective telecentric lens system of claim 12, wherein, when a distance between the object plane and the first lens assembly reduces, the second lens assembly is configured to move in a direction closer to the reflector.

16. The internal-reflective telecentric lens system of claim 12, wherein, when a distance between the object plane and the first lens assembly increases, the second lens assembly is configured to move in a direction away from the reflector.

17. The internal-reflective telecentric lens system of claim 12, wherein:
the object plane is a light spot array; and
a focal plane of the internal-reflective telecentric lens system is adjustable by adjusting the second lens assembly to switch the light spot array to a flood light.

18. The internal-reflective telecentric lens system of claim 15, wherein:
the object plane is a light spot array; and
a focal plane of the internal-reflective telecentric lens system is adjustable by adjusting the second lens assembly to switch the light spot array to a flood light.

19. An internal-reflective telecentric lens system, comprising:
a first lens assembly;
a reflector; and
a second lens assembly, wherein:
the first lens assembly comprises a first lens;
the second lens assembly comprises a second lens, a third lens, and a fourth lens, that are disposed in sequence along a light path;
the reflector is disposed at an image side of the first lens;
the second lens is disposed at an image side of the reflector;
the fourth lens is disposed at an image side of the second lens;
the first lens assembly is configured to receive and output one or more light beams towards the reflector;
the reflector is configured to reflect the one or more light beams towards the second lens assembly;
the second lens assembly is configured to receive and converge the one or more light beams reflected by the reflector at a diaphragm between the second lens and the fourth lens, and transmit the one or more light beams past the diaphragm through the fourth lens for imaging;
an object-side surface of the third lens is concave, and an image-side surface of the third lens is convex, and
a reflective surface of the reflector is configured to reflect the one or more light beams towards the second lens assembly, and the reflector comprises a metal layer as the reflective surface.

20. An internal-reflective telecentric lens system, comprising:
a first lens assembly;
a reflector; and
a second lens assembly, wherein:
the first lens assembly comprises a first lens;
the second lens assembly comprises a second lens, a third lens, and a fourth lens, that are disposed in sequence along a light path;
the reflector is disposed at an image side of the first lens;
the second lens is disposed at an image side of the reflector;
the fourth lens is disposed at an image side of the second lens;
the first lens assembly is configured to receive and output one or more light beams towards the reflector;
the reflector is configured to reflect the one or more light beams towards the second lens assembly;
the second lens assembly is configured to receive and converge the one or more light beams reflected by the reflector at a diaphragm between the second lens and the fourth lens, and transmit the one or more light beams past the diaphragm through the fourth lens for imaging;
an object-side surface of the third lens is concave, and an image-side surface of the third lens is convex, and a reflective surface of the reflector is configured to reflect the one or more light beams towards the second lens assembly, and the reflector comprises a dielectric coating as the reflective surface.

\* \* \* \* \*